United States Patent [19]
Keil et al.

[11] Patent Number: 4,753,999

[45] Date of Patent: Jun. 28, 1988

[54] COPOLYMER, PROCESS FOR ITS PREPARATION, AND ITS USE

[75] Inventors: Karl-Heinz Keil, Hanau-Mittelbuchen; Fritz Engelhardt, Frankfurt am Main; Klaus Sternberger, Bad Vilbel; Günter Rösch, Bad Soden, all of Fed. Rep. of Germany

[73] Assignee: Cassella Aktiengesellschaft, Frankfurt am Main, Fed. Rep. of Germany

[21] Appl. No.: 669

[22] Filed: Jan. 6, 1987

[30] Foreign Application Priority Data

Jan. 10, 1986 [DE] Fed. Rep. of Germany ....... 3600514

[51] Int. Cl.$^4$ ............................................. C08F 20/60
[52] U.S. Cl. ................................. 525/328.3; 526/295; 526/307; 526/312
[58] Field of Search ................... 526/295, 307, 307.1, 526/307.3, 312; 525/328.3

[56] References Cited

U.S. PATENT DOCUMENTS

| | | | |
|---|---|---|---|
| 2,923,701 | 2/1960 | Schuller et al. | 260/55.5 |
| 3,032,539 | 5/1962 | Schuller | 526/307.3 |
| 3,912,693 | 10/1975 | Shimizu | 526/312 |
| 4,305,860 | 12/1981 | Iovine | 526/295 |
| 4,617,362 | 10/1986 | Becker | 526/307 |

FOREIGN PATENT DOCUMENTS 1216399 12/1968 Fed. Rep. of Germany.

*Primary Examiner*—Paul R. Michl
*Assistant Examiner*—Patrick A. Doody
*Attorney, Agent, or Firm*—Connolly & Hutz

[57] ABSTRACT

A textile auxiliary for improving the fastness of materials dyed or printed with a dyestuff is a copolymer of a diallylammonium monomer, a vinyl amide monomer and a (meth)acrylic ester monomer.

12 Claims, No Drawings

COPOLYMER, PROCESS FOR ITS PREPARATION, AND ITS USE

The invention relates to a water-soluble, non-crosslinked or, preferably, crosslinked copolymer, to a process for its preparation and to its use as a textile auxiliary. The textile auxiliary is used, in particular, for improving the fastness properties of dyeings and prints with reactive dyestuffs on cellulose material.

The textile material to be dyed or printed with reactive dyestuffs can be in the form of, for example, woven fabrics, knitted fabrics or yarn or filaments and can consist of cellulose or contain cellulose as well as synthetic fibres. The dyeing of these materials can be effected in accordance with known processes by treating the textile material in the manner of an exhaustion process with a dye liquor containing reactive dyestuff, in most cases at elevated temperature and, in the case of most commercial types of reactive dyestuffs, in the presence of alkali, or it is possible to employ two-stage processes, such as, for example, the so-called pad-steam process or the cold pad-batch process. In the pad-steam process and also in the cold pad-batch process, the textile material is first padded with a reactive dyestuff liquor, it being possible for alkali to be already present or to be applied in a separate impregnation stage. In the pad-steam process, the fixation of the dyestuff is then effected by a steaming process, while in the cold pad-batch process this is effected by batching up the impregnated goods and keeping it for several hours at normal temperature. Other fixing stages, such as, for example, treating the goods which have been padded with an alkali-free reactive dyestuff liquor with hot waterglass solution have been disclosed and are practised in industry.

In all reactive dyeing and printing processes a covalent chemical bond is produced between the dyestuff molecule and the cellulose molecule in the course of the dyeing and printing process. This type of dyestuff is thus chemically anchored to the cellulose fibre.

Theoretically, therefore, dyeings and prints of reactive dyestuffs on cellulose should, without further treatment, exhibit very high fastness to wet processing. In practice, however, it is found that this is not the case. The reasons for this are various and possibly not all of them are yet known. It can be said, however, that a proportion, of varying size, of the reactive dyestuffs employed for dyeing does not react with the cellulose fibre but with water molecules. In the reaction with water the reactive dyestuff loses its capacity for forming a chemical bond with the cellulose and is only attached to the cellulose fibre molecule by subsidiary valency forces.

The end result of this phenomenon in carrying out dyeings in practice is that dyeings and prints of reactive dyestuffs on cellulose fibres only exhibit high fastness to wet processing if they are subjected to a thorough rinsing after the dyeing operation. This necessary after-treatment can require a technical effort equivalent to the actual dyeing process. In particular, large amounts of water are required for rinsing, and it is frequently necessary to arrange not only a single washing process, but several successive washing processes, in order to achieve the desired higher fastness to wet processing of the dyeings.

There has also been no lack of attempts and proprosals to facilitate the washing out of the dyestuff residues and/or to increase the fastness to wet processing of dyeings and prints, without having to increase the effort on washing out.

German Offenlegungsschrift No. 2,910,583 discloses a soaping auxiliary for dyeings and prints on textile materials which is based on the use of an alkali metal aluminosilicate, if appropriate in combination with polyvinylpyrrolidone.

The problem of removing from the fibre the portions of hydrolysed reactive dyestuff which are in themselves water-soluble but are attached by virtue of their substantivity to the cellulose fibre by subsidiary valency forces, and hence of improving the fastness to wet processing of the goods, has also already been taken up in German Offenlegungsschriften No. 2,747,358 (corresponding to British Pat. Nos. 2,006,279) and 2,843,645. According to the recommendation of German Offenlegungsschrift No. 2,747,358, polyamines, polyamides or polyurethanes and also polyureas should be employed for this purpose. According to the statements in German Offenlegungsschrift No. 2,843,645, alkoxylated polyamines, such as, for example, alkoxylated polyethyleneimine.

The after-treatment of dyeings by means of basic polyguanidine compounds and polymeric, quaternized, nitrogen-containing compounds is disclosed in German Auslegeschriften Nos. 1,111,144 and 1,131,649, Belgian Patent Specification No. 625,711 (corresponding to U.S. Pat. No. 3,301,696) and U.S. Pat. No. 3,334,138 for the solution of another problem, namely improving the wet fastness properties of substantive dyeings.

It is also known to carry out an after-treatment with condensation products formed from cyanamide, formaldehyde and salts of organic amines or ammonium salts in order to improve the fastness to wet processing of substantive dyeings.

Japanese Patent Specification No. 60.021987 describes reaction products of tertiary polyamines with polybasic carboxylic acids, such as, for example, phenolsulphonic acids, phenolcarboxylic acids and polycarboxylic acids and also anhydrides thereof for improving the fastness properties to wet processing of reactively dyed or printed textiles. As a result of their salt character, products of this type have the disadvantage that their effect becomes weaker at high concentrations of electrolyte. The after-treatment of textiles dyed with reactive dyestuffs by means of condensation products formed from aminoalkanephosphonic acids with epichlorohydrin in the presence of stabilizers is described in European Pat. No. 100,300 (corresponding to U.S. Pat. No. 4,515,596).

Polymers formed from a polyalkylenepolyamine with epichlorohydrin are also described in German Offenlegungsschrift No. 3,216,745 (corresponding to U.S. Pat. No. 4,452,606) for improving the fastness of dyeings.

However, all the polymeric products based on peralkylated polyamines which have hitherto been described for the aftertreatment of reactive or substantive dyeings have the decisive disadvantage that unforeseen changes of shade can occur when dyeing with metal complex reactive dyestuffs. In addition, their effectiveness is in some cases relatively low, so that it is necessary to employ large amounts in order to achieve significant effects. The effects achieved are not adequate, particularly in regard to fastness to washing and also in regard to fastness properties to wet rubbing. When reactive dyeings are subjected to after-treatment with the known condensation products formed from cyanamide, formaldehyde and amines, the fastness to perspiration which can be achieved still leaves much to be desired. In addition, traces of formaldehyde are often found on the treated goods. After-treatment with the basic compounds known in the state of the art is also difficult as far as the process is concerned. This is because this treatment must be carried out very carefully in order to avoid the reprecipitation of detached dyestuff and the agglutination of adsorbed portions of dyestuff on the surface of the fibre. If the known after-treatment agents are handled without care, it is thus readily possible for the opposite of the desired effect to take place.

A further drawback of after-treatment agents hitherto disclosed and based on peralkylated polyamines consists in the fact that they split off amines, such as methylamine or dimethylamine, in a pH range higher than 9. This results in considerable odour nuisance even if their usage is at the trace level. Polyethyleneimine also behaves similarly.

In principle, of course, it is possible to produce reactive dyeings having high wet fastness properties easily by washing the dyed material in an adequate number, for example 6 to 8, of successive washing processes with vigourous mechanical agitation at a high temperature and using effective detergents. However, not only is this process very time-consuming and a high outlay on apparatus is required for it, but a large amount of water is also consumed in this process, which is no loner tolerable in regard to reasonable utilization of water, particularly of drinking water supplies. In addition, very large amounts of spent wash liquors are produced, which have to be worked up before being passed into sewers or rivers.

It has now been found, surprisingly, that a large fraction of the washing stages otherwise required can be dispensed with in the production of reactive dyeings, and yet that dyeings of excellent fastness are obtained, if the dyeings are subjected to an after-treatment with a copolymer according to the invention.

The water-soluble copolymer according to the invention can be prepared by copolymerizing (a) a diallylammonium component A of the formula I

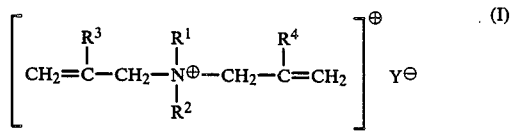

and (b) an amide component B consisting of a basic component $B^1$ of the formula II

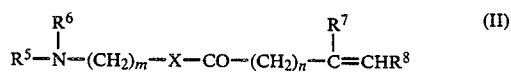

and/or an amide component $B^2$ of the formula III

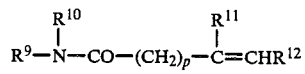

and/or an N-vinylacylamide component $B^3$ of the formula IV

and/or an ammonium component $B^4$ of the formula V

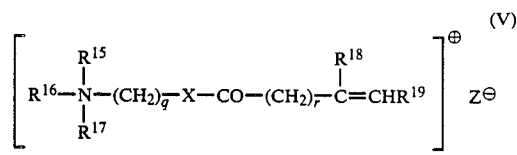

and (c) a (meth)acrylic ester component C of the formula VI

in a molar ratio A:B:C of 1:(0.002 to 4.5):(0 to 0.5) and, if a component $B^1$ is present, by subsequent optional crosslinking with (d) a polyfunctional alkylation component D and (e) a polyamine component E consisting of a polyamine component $E^1$ of the formula VII

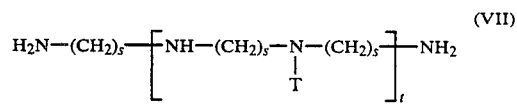

and/or a polyamine component $E^2$ of the formula VIII

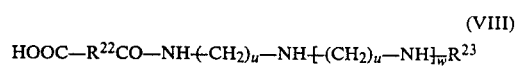

in a molar ratio $B^1$:D:E of 1:(0.002 to 2):(0 to 5), $R^1$, $R^2$, $R^5$, $R^6$ and $R^{21}$ being ($C_1$-$C_{10}$)-alkyl, $R^3$, $R^4$, $R^7$, $R^8$, $R^{11}$, $R^{12}$, $R^{18}$, $R^{19}$ and $R^{20}$ being hydrogen or methyl, $R^9$, $R^{10}$ and $R^{13}$ being hydrogen or ($C_1$-$C_8$)-alkyl, $R^{14}$, $R^{15}$, $R^{16}$ and $R^{17}$ being ($C_1$-$C_8$)-alkyl, or $R^{13}$ and $R^{14}$ together being —$(CH_2)_3$—, —$(CH_2)_4$— or —$(CH_2)_5$—

$R^{22}$ being an alkylene radical having 1 to 8 C atoms or phenylene, $R^{23}$ being hydrogen or the radical —CO—$R^{22}$—COOH, X being —NH— or —O—, $Y^\ominus$ and $Z^\ominus$ being a monovalent anion or a portion of a polyvalent anion equivalent to a monovalent anion, T being

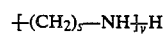

m and q being one of the numbers 2, 3, 4, 5, 6, 7, 8, 9 or 10, n, p, r and w being one of the numbers 0, 1, 2 or 3, s and u being one of the numbers 2, 3, 4 or 5, v being the number 0 or a number of such magnitude that, taking into account t, the polyamine component $E^1$ has a molecular weight of 1000 to 30,000, and t being a number of such magnitude that, taking account of v, the molecular weight of the polyamine component $E^1$ of the formula VII is between 1000 and 30,000.

The alkyl radicals $R^1$, $R^2$, $R^5$, $R^6$, $R^9$, $R^{10}$ and $R^{13}$ to $R^{17}$ can be linear or branched alkyl radicals.

The radicals $R^1$ and $R^2$ in the diallylammonium component A of the formula I can be identical or different. $R^1$ and $R^2$ preferably denote $(C_1-C_4)$-alkyl, very preferably methyl. The radicals $R^3$ and $R^4$ can also be identical or different. They are preferably identical, and it is particularly preferable for $R^3=R^4$ to denote hydrogen.

X preferably represents —NH—.

The radicals $Y^\ominus$ and $Z^\ominus$ represent monovalent anions, such as, for example, nitrate, bisulphate, benzenesulphonate, acetate or trifluoroacetate, or a fraction of a monovalent anion equivalent to a monovalent anion, such as, for example, half an equivalent of sulphate or one third of an equivalent of phosphate. Preferably, the radicals $Y^\ominus$ and $Z^\ominus$ each represent a halogen anion, such as fluoride, bromide or iodide or preferably chloride.

The diallylammonium component A can consist of one compound of the formula I or of several compounds of the formula I. The other components B, $B^1$, $B^2$, $B^3$, $B^4$, C, D, $E^1$ and $E^2$ can also each consist of one compound or of several compounds.

The amide component B can consist of an amide component $B^1$ or of an amide component $B^2$ or of an N-vinylacylamide component $B^3$ or of an ammonium component $B^4$. The amide component B can, however, also consist of, for example, two individual components (for example $B^1+B^2$, $B^1+B^3$, $B^2+B^3$ or $B^3+B^4$) or of, for example, three individual components (for example, $B^1+B^2+B^3$ or $B^1+B^3+B^4$). The amide component B can, however, also contain all four individual components ($B^1+B^2+B^3+B^4$). In all the cases mentioned, the individual components $B^1$, $B^2$, $B^3$ and $B^4$ can, in turn, consist of one or more individual compounds of the formulae indicated.

In the formula II for the basic component $B^1$, X preferably denotes —NH— and n preferably denotes the number 0 and m preferably denotes one of the numbers 2, 3 or 4. $R^5$ and $R^6$ can be identical or different, and preferably denote $(C_1-C_4)$-alkyl. $R^7$ and $R^8$ can also be identical or different. The following are examples of preferred compounds of the formula II:

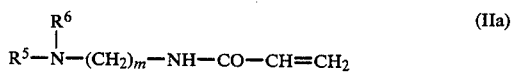

(IIa)

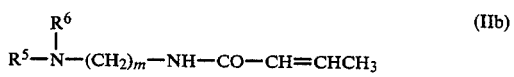

(IIb)

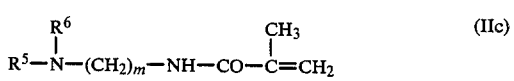

(IIc)

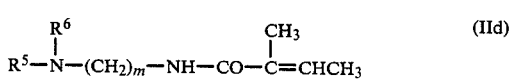

(IId)

and, in the formulae IIa to IId, $R^5$, $R^6$ and m have, in particular, the preferred meanings.

In the formula III for the amide component $B^2$, p preferably denotes the number 0. $R^9$ and $R^{10}$ on the one hand and $R^{11}$ and $R^{12}$ on the other hand can be identical or different. $R^9$ and $R^{10}$ preferably denote hydrogen or $(C_1-C_4)$-alkyl. The following are examples of preferred compounds of the formula III:

(IIIa)

(IIIb)

(IIIc)

(IIId)

and, in the formulae IIIa to IIId, $R^9$ and $R^{10}$ have, in particular, the preferred meanings.

In the formula IV for the N-vinylacylamide component $B^3$, $R^{14}$ preferably denotes $(C_1-C_4)$-alkyl. $R^{13}$ preferably denotes hydrogen or $(C_1-C_4)$-alkyl. $R^{13}$ and $R^{14}$ together also preferably denote $-(CH_2)_3-$, $-(CH_2)_4-$ or $-(CH_2)_5-$. Examples of preferred compounds of the formula IV are N-vinyl-2-pyrrolidone, N-vinyl-2-piperidone and N-vinyl-$\epsilon$-caprolactam.

In the formula V for the ammonium component $R^4$, X preferably denotes —NH—. $R^{15}$, $R^{16}$ and $R^{17}$ can be identical or different, and preferably denote $(C_1-C_4)$-alkyl, very particularly preferably methyl; r preferably denotes the number O and q preferably denotes one of the number 2, 3 or 4.

In the formula VI for the (meth)acrylic ester component C, $R^{21}$ as a rule denotes $(C_1-C_8)$-alkyl, preferably $(C_1-C_4)$-alkyl. If $R^{20}=$hydrogen, the compounds of the formula VI are acrylic esters; if $R^{20}=$methyl, they are methacrylic esters.

The polyfunctional alkylation component D has, for example, the formula IX

(IX)

wherein X is the number 0, 1, 2 or 3, preferably O and A, $A^1$ and $A^2$ denote identical or different radicals of the formula $-CH_2A^3$ or an epoxide radical (oxirane radical) of the formulae X or XI

(X)

(XI)

$A^3$ is a substituent which can be split off as an anion, in particular chlorine, bromine or iodine, or a group which can be split off as an anion, such as, for example, hydroxyl, a sulphato radical or a phosphato radical, and Z represents a direct bond or an (x+2)-valent organic radical.

Z can be an aliphatic, aromatic or araliphatic radical, it being possible for aliphatic and araliphatic radicals also to contain keto groups —CO— or hetero-atoms, such as —O— or —S—, or groupings of hetero-atoms, such as —SO—, —SO$_2$—, —NH— or —N(CH$_3$)—. In agreement with the preferred meaning of x as O, a divalent radical is preferable for x, so that a bifunctional alkylation component is preferred as the polyfunctional alkylation component D. Particularly preferred bifunctional alkylation agents correspond to the formula XII $$A-Z^1-A^1 \tag{XII}$$

wherein $Z^1$ represents a direct bond, a phenylene radical, in particular a 1,4-phenylene radical, or a radical of the formula —(CH$_2$)$_y$— or —(CH$_2$)$_k$—G—(CH$_2$)$_l$—, y denoting a number from 1 to 6, k and l denoting numbers from 1 to 6 and G denoting —O—, —S—, —SO—, —SO$_2$—, —NH—, —N(CH$_3$)—, —CO—, —CHOH— or phenylene, in particular 1,4-phenylene. k and l are preferably identical and preferably denote 1 or 2, in particular 1.

The following are examples of preferred bifunctional alkylating agents of the formula XII: epichlorohydrin (=chloromethyloxirane), epibromohydrin, 1,3-dichloropropan-2-ol, 2,2'-dichlorodiethyl ether, 2,2'-dichlorodiethylamine, 2,2'-dichlorodiethyl sulphide, 2,2'-dichlorodiethyl sulphoxide, 2,2'-dichlorodiethyl sulphone, 2,2'-bis-(sulphato)-ethyl ether, 2,2'-bis-(phenylsulphonyloxy)-ethyl ether, 2,2'-bis-(p-tolylsulphonyloxy)-ethyl ether, diepoxybutane, diepoxy-2-methylbutane, bisglycidylamine (=bis-(2,3-epoxypropyl)-amine), 1,2-bis-(epoxyethyl)-benzene, 1,4-bis-(epoxyethyl)-benzene, 1,2-bis-(2,3-epoxypropyl)-benzene, 1,4-bis-(2,3-epoxypropyl)-benzene, 1,2-bis-(chloromethyl)-benzene or 1,4-bis-(chloromethyl)-benzene.

The polyamine component E can consist of a component $E^1$ or $E^2$ or of the two components $E^1$ and $E^2$.

In the formula VII of the polyamine component $E^1$, s preferably denotes the number 2. In this case, preferred suitable representatives of the polyamine component $E^1$ of the formula VII are commercially available polyethyleneimines having a molecular weight between 2000 and 27,000, preferably between 2000 and 20,000 and particularly preferably between 2000 and 5000. Polyethyleneimines of this type are available commercially. They are prepared by polymerization of ethyleneimine, and contain about 50 to 600 ethyleneimine units and, usually, primary, secondary and tertiary nitrogen atoms in a numerical ratio of about 1:2:1. The various nitrogen atoms are distributed statistically within the molecule. In the process for the preparation of the crosslinked copolymers, they are preferably employed without further treatment in the form of their commercially available aqueous solutions.

In the polyamine component $E^2$ of the formula VIII, the alkylene radical represented by $R^{22}$ can be branched or, preferably, linear. A phenylene radical represented by $R^{22}$ is preferably a 1,4-phenylene or 1,2-phenylene radical. The compounds of the formula VIII constitute reaction products of amines of the formula XIII $$H_2N-(CH_2)_u-NH + (CH_2)_u-NH_{\overline{w}}H \tag{XIII}$$

with dicarboxylic acids of the formula XIV $$HOOC-R^{22}-COOH \tag{XIV}$$

in a molar ratio of 1:(0.5 to 1). u preferably denotes 2 or 3 and w preferably denotes 1, 2 or 3. The following are examples of preferred amines of the formula XIII:

H$_2$N—CH$_2$—CH$_2$—NH—CH$_2$—CH$_2$—NH$_2$,
H$_2$N—CH$_2$—CH$_2$—CH$_2$—NH—CH$_2$—CH$_2$—CH$_2$—NH$_2$,
H$_2$N—CH$_2$—CH$_2$—NH—CH$_2$—CH$_2$—NH—CH$_2$—CH$_2$—CH$_2$—NH$_2$,
H$_2$N—CH$_2$—CH$^2$—NH—CH$_2$—CH$_2$—NH—CH$_2$—CH$_2$—NH—CH$_2$—CH$_2$—NH$_2$.

Examples of suitable dicarboxylic acids of the formula XIV are oxalic acid, malonic acid, succinic acid, glutaric acid, adipic acid, pimelic acid, suberic acid, azelaic acid, sebacic acid, phthalic acid and isophthalic acid.

In the copolymer according to the invention the molar ratio A:B:C is preferably 1:(0.02 to 2.5):0. Crosslinked copolymers according to the invention are, in particular, preferably those in which the molar ratio $B^1$:D:E is 1:(0.002 to 1):(0.05 to 5), preferably 1:(0.01 to 1):(0.1 to 4.5).

The starting components required for the preparation of the copolymers according to the invention are known or can be prepared by processes which are known for the particular class of substances.

The preparation of the water-soluble copolymers according to the invention by copolymerization of the diallyl component A, the amide component B and the (meth)acrylic ester component C is carried out in a suitable solvent. Suitable solvents are water and solvents miscible with water, such as, for example, lower alcohols, such as, for example, methanol, ethanol, n-propanol, isopropanol, n-butanol or tert.-butanol, glycols, such as, for example, ethylene glycol or propylene glycol, diglycols and polyglycols, such as, for example, diethylene glycol or triethylene glycol, glycol ethers, such as, for example diethylene glycol monomethyl ether, diethylene glycol monoethyl ether, ethylene glycol monomethyl ether, ethylene glycol monoethyl ether, ethylene glycol mono-n-propyl ether, ethylene glycol mono-n-butyl ether, ethylene glycol dimethyl ether or ethylene glycol diethyl ether, or ketones, such as, for example, acetone or methyl ethyl ketone.

The copolymerization can also be carried out in a mixture of different solvents, preferably in a solvent mixture containing small amounts of water. If, for example, the diallylammonium component A is employed in the form of an aqueous solution, the addition of further water is normally not necessary.

Before the start of the copolymerization it is preferable to adjust the pH to values of 3 to 8.5. An acid, preferably an organic acid and particularly acetic acid, is generally used for this adjustment of the pH.

The copolymerization is carried out at temperatures from 40° to 100° C., preferably 60° to 90° C. and very particularly preferably at temperatures from 65° to 85° C., and is initiated in a customary manner, for example by adding suitable initiators. Suitable initiators are substances which form free radicals, such as, for example, benzoyl peroxide, tert.-butyl hydroperoxide, cumene peroxide, methyl ethyl ketone peroxide, lauryl peroxide, tert.-butyl perbenzoate, ditert.-butyl perphthalate, azodiisobutyronitrile, 2,2'-azobis-(2,4-dimethylvaleronitrile), 2-phenylazo-2,4-dimethyl-4-methoxyvaleronitrile, 2-cyano-2-propylazoformamide, azodiisobutyramide, dimethyl, diethyl or di-n-butyl azobismethyl valerate, tert.-butyl perneodecanoate, diisononanoyl peroxide, tert.-amyl perpivalate, di-2-ethylhexyl peroxodicarbonate, dilauroyl peroxide, diisotridecyl peroxodicarbonate or tert.-butyl peroxyisopropyl percarbonate. It is preferable to use 2,2'-azo-bis-(2-amidinopropane) dihydrochloride as the initiator. Relative to the amount of monomer of the components A+B+C, 0.01 to 2% by weight, preferably 0.1 to 1% by weight, of initiator are used. It is preferable to carry out the copolymerization with the exclusion of oxygen. This can be effected in a manner which is in itself known by flushing with or passing through an inert gas, such as, for example, nitrogen. The components A, B and C, which can each consist of one or more individual components, are employed in amounts such that the molar ratio A:B:C is 1:(0.002 to 4.5):(0 to 0.5), preferably 1:(0.02 to 2.5):0.

The copolymerization is complete after approx. 30 minutes to approx. 4 hours, in many cases after 30 minutes to 2½ hours. When the copolymerization is complete, there is normally an approx. 15 to 55% strength by weight solution, which can be used in this form without further treatment as a textile auxiliary. However, before it is used as a textile auxiliary, the pH is frequently adjusted to values from 3 to 8.5, preferably 7 to 8. A strong acid, such as, for example, hydrochloric acid, sulphuric acid, phosphoric acid or nitric acid is normally used for this adjustment of the pH.

Amongst the water-soluble copolymers according to the invention preferred copolymers are those in the preparation of which the amide component B which is used is one which consists of a basic component $B^1$ of the formula III or contains a basic component $B^1$ of this type, particularly if these copolymers have been additionally subjected to a crosslinking reaction after the copolymerization. In this regard, the compounds of the formulae IIa to IId are preferred as the basic component $B^1$.

In order to carry out the crosslinking reaction, the solution obtained in the copolymerization is reacted, in the presence of water, with a polyfunctional alkylation component D and preferably additionally with a polyamine component E. The polyamine component here can consist of a polyamine component $E^1$ or $E^2$ or of a mixture of these components. If a polyamine component E is employed in the crosslinking reaction, it is added to the aqueous solution of the copolymer to be crosslinked before the polyfunctional alkylation component D. Relative to 1 mol of the basic component $B^1$ which is copolymerized in the non-crosslinked copolymer, the molar ratio $B^1$:D:E in the crosslinking reaction is 1:(0.002 to 2):(0 to 5), preferably 1:(0.002 to 1):(0.05 to 5) and particularly preferably 1:(0.01 to 1):(0.1 to 4.5). The crosslinking is carried out at temperatures from 30° to 90° C., preferably 40° to 60° C., and is terminated after only a few minutes, for example 5 to 20 minutes, preferably 5 to 10 minutes, by adding a mineral acid, such as, for example, hydrochloric acid, sulphuric acid, phosphoric acid or nitric acid. In this reaction, the pH is adjusted to a value from 4 to 7 by the addition of the mineral acid.

The solutions of the non-crosslinked or crosslinked copolymer obtained in the preparation have a content of active compound of approx. 25 to 55% by weight, and can be employed as a textile auxiliary without further treatment in this form, though preferably after dilution to an active compound content of approx. 25 to 35% by weight.

The solutions of the crosslinked or non-crosslinked copolymers according to the invention obtained in the preparation can be dissolved in water to form either a true solution or at least a colloidal solution. They are excellently suitable for use as textile auxiliaries, in particular for improving the fastness of dyeings and prints of reactive dyestuffs on cellulose materials.

Normally the after-treatment according to the invention of reactive dyeings and prints is carried out at a liquor ratio of 1:5 to 1:3, preferably 1:10 to 1:20. In this after-treatment, a liquor containing 0.5 to 6 g, preferably 1 to 3 g, of the copolymer according to the invention per liter is employed. In special cases, it is, of course, possible to vary the liquor ratio and the concentration of auxiliary beyond the normal limits indicated. The desired improvements in fastness are basically achieved if the amounts of copolymer applied, in the form of the approx. 25 to 55% strength by weight solution obtained in the preparation, is 0.5 to 10%, preferably 1 to 8% and especially 2 to 6%, of the weight of the goods. It is preferable to carry out the after-treatment at temperatures from room temperature up to 100° C., preferably up to 60° C. and particularly at room temperature. It is only necessary to rinse once more afterwards. A marked improvement in fastness properties is achieved, in particular in fastness to wet processing and rubbing.

The copolymer according to the invention is also suitable for improving the fastness of dyeings and prints obtained with substantive vat dyestuffs. In these cases it is employed in the same manner as in the improvement of the fastness of dyeings and prints obtained with reactive dyestuffs. It can, in particular, also be employed as a fastness-improving auxiliary in the simultaneous, quasi-one-bath sizing and dyeing of cellulose materials by means of vat dyestuffs. In these cases, the copolymer is added in the form of the approx. 25 to 55% strength by weight solution obtained in the preparation to the size-dyeing liquors in amounts of, as a rule, 20 to 80 g/l, preferably 30 to 60 g/l. Although a greater added amount is possible, it is not, as a rule, necessary. Lower added amounts than those indicated can also be adequate in individual cases, for example if very pale shades are being dyed or if the requirements for improvement in fastness are not quite so high. The quasi-one-bath size-dyeing process using the copolymer according to the invention is carried out in accordance with the sizing or size-dyeing processes which are already in themselves known and is carried out in the machines employed for this purpose. Thus the fibre material to be processed is passed in turn through the available impregnating troughs of the machine, and is then dried and fed to the fibre stock of the further processing machine. Normally there are inserted, between the impregnating troughs of the size-dyeing machine, air passages of varying length, the length of which is proportioned in a known manner so that the dyeing time required for the dyestuff employed is achieved. The drying of the yarn impregnated in the impregnating troughs is effected by supplying heat, as a rule by contact heat via drying rollers, and it generally results in completion of the dyeing process and complete fixation of the dyestuff on the substrate. In carrying out the quasi-one-bath size-dyeing process using the copolymer according to the invention it is of particular advantage if a fourth impregnating trough is additionally inserted, instead of the 3 impregnating troughs customary in most machines. The impregnating troughs are charged in a manner which is in itself customary with the size-dyeing liquor, the concentration of the sizing agent in the liquor depending on the amount of size coating required for the further processing step and on the nature of the fibre. At a given liquor pick-up, which is normally between 100 and 200%, the dyestuff concentration depends on the depth of colour desired. As a rule, the liquors contain 30 to 80 g per liter of sizing agent and 10 to 50 g per liter of dyestuff. In this connection, it is preferable to select a somewhat higher dyestuff concentration in the first impregnating trough than in the following troughs, and instead to make the concentration of the sizing agent higher in the last troughs than in the preceding troughs. If four impregnating troughs are employed, it is advantageous to work without added dyestuff in the fourth impregnating trough. It is preferable to keep the concentration of the copolymer according to the invention somewhat lower in the baths having higher concentrations of dyestuff and to utilize a somewhat higher concentration of auxiliary in baths having lower concentrations of dyestuff. Thus, the concentrations of auxiliary in the first bath are preferably adjusted at between 0 and 20 g/l, while those in the last bath are adjusted within the range from 20 to 60 g/l.

Suitable sizing agents are any products customarily employed, such as, for example, starch and starch derivatives, sizing agents based on carboxymethylcellulose, vinyl homopolymers or copolymers, acrylate copolymers or water-soluble polyesters. It is preferable to employ the agents which are particularly suitable for cellulose materials, in particular agents based on starch and starch derivatives or carboxymethylcellulose. Starch and starch derivatives are particularly preferred as sizing agents.

The following are suitable dyestuffs for the size-dyeing process: vat dyestuffs, which can be found in the "Colour-Index", third edition, volume 3, pages 3727–3837.

The or vat dyestuffs are added to the size-dyeing liquors in their reduced, and hence water-soluble, form. Concentrated aqueous solutions of the vat dyestuffs which have been rendered water-soluble by reduction are described as stock vat in the following text, in particular in the illustrative embodiments. The preparation of these stock vats is known. It is effected by heating aqueous dispersions of vat or vat dyestuffs, which in themselves are water-insoluble, with reducing agents, sodium dithionite ("hydrosulphite") being used, as a rule, In addition to the vatted or reduced dyestuffs, the known sizing agents and the fastness-improving auxiliaries to be employed in accordance with the invention, the size-dyeing liquors can also contain, in addition, further auxiliaries and additives such as are known from customary dyeing processes. In particular, it is advantageous to add to the liquors known dyeing accelerators and wetting and dispersing agents in the customary concentrations. If necessary, it is also possible to add reducing agents which prevent the re-oxidation of the vatted dyestuffs.

A very considerable improvement in the wet fastness properties of the size-dyeings is achieved by the use of the copolymers according to the invention. An additional result is also an improved sizing of the yarn as a result of better film-formation by the sizing agent. Finally, it is also possible to establish an increased weaving efficiency.

In addition, the copolymer according to the invention can also be employed as a textile auxiliary for improving the fastness of dyeings and prints, in particular those made with reactive dyestuffs and substantive dyestuffs, on textiles composed of cellulose fibres and mixtures thereof with synthetic fibres, these textiles subsequently being subjected to finishing or permanent finishing. The result of such finishing or permanent finishing is to achieve, for example, an easy-care finish, a wash-and-wear finish, a crease-resistant and shrink-resistant finish or a permanent fixation of calendered effects. It is known to carrying out permanent finishing. In this process the textiles are treated with reactant resins, such as, for example, those based on N-methyloldihydroxyethyleneurea or N-dimethyloldihydroxyethyleneurea, which, in the presence of acid donors, crosslink with the hydroxyl groups of the cellulose fibres. The textile material is thus treated with a permanent finishing liquor containing the reactant resin in amounts of approx. 30 to 250 g/liter, a catalyst, such as, for example, zinc chloride or magnesium chloride, and, if appropriate, also other auxiliaries, additives, softeners, fillers and/or water-repelling agents. The copolymer according to the invention is added to a permanent finishing liquor of this type in the form of the 25 to 55% strength by weight solution obtained in the preparation, and in amounts of, for example, 10 to 70 g/liter, preferably 20 to 50 g/liter. The material treated with the permanent finishing liquor is then dried. The reactant resin is then subjected to complete condensation on the goods at an elevated temperature. Condensation is usually effected for $3\frac{1}{2}$ to 4 minutes at 150° C. or for 60 to 30 seconds at 170° to 185° C. A rinsing process is normally not carried out. By using the copolymers according to the invention in the course of a permanent finishing treatment, the fastness properties, particularly the wet fastness properties, are in some cases considerably improved.

In the following examples temperatures are quoted in degrees celsius. Unless otherwise indicated, parts denote parts by weight and percentages denote percentages by weight.

EXAMPLE 1

122.5 g of ethanol, 150 g of a 60% strength aqueous solution of dimethyldiallylammonium chloride, 10 g of dimethylaminopropylmethacrylamide and 3.5 g of acetic acid are initially placed in a 700 ml 4-necked flask equipped with an anchor stirrer, a thermometer, a reflux condenser, a gas inlet tube and a dropping funnel. The solution is then heated up to an internal temperature of 70° to 75° C. while nitrogen is passed through, and 0.2 g of the initiator 2,2'-azobis-(2-amidinopropane) dihydrochloride is added at 60° to 65° C. Copolymerization sets in at 76° to 77° C. Stirring is then continued for a further 2 hours at an internal temperature of 76° to 77° C. 22.2 g of a commercially available polyethyleneimine having an average molecular weight of 3000 to 5000 are then added in the form of a 50% strength aqueous solution, followed by 0.536 g of epichlorohydrin, and the mixture is stirred for a further 15 minutes at 78° C. Crosslinking is then terminated by adding 13.8 g of sulphuric acid (diluted with water in a 1:1 ratio) and the pH is adjusted to a value of 7.

The active compound content is then adjusted to 30% with water.

Yield: 330 g.

The progress of copolymerization and crosslinking can be detected from the K-values measured for the solution.

K value before copolymerization: $16.3 \times 10^3$,

-continued

| K value after copolymerization: | 24.8 × 10³, |
| K value after crosslinking: | 34.4 × 10³. |

EXAMPLE 2

122.5 g of ethanol, 80 g of N-vinylpyrrolidone and 33 g of dimethyldiallylammonium chloride (in the form of a 60% strength aqueous solution) are initially placed in a 700 ml 4-necked flask, equipped with an anchor stirrer, a thermometer, a reflux condenser and a gas inlet tube, and the mixture is heated to an internal temperature of 79° to 82° C. while nitrogen is passed in. 0.1 g of dibenzoyl peroxide is added at 60° C., and the reaction is initiated at 80° C. Stirring is then continued for a further 2 hours at 70° C. to 75° C. and, after cooling, the pH of the solution is adjusted to a value of 7.0 with dilute sulphuric acid.

The resulting solution of the copolymer is then adjusted to a content of 20% with water.

EXAMPLE 3

245 g of ethanol, 316.5 g of a 60% strength aqueous solution of dimethyldiallylammonium chloride and 10 g of acrylamide are initially placed in a 1 liter 4-necked flask, equipped with an anchor stirrer, a thermometer, a reflux condenser and a gas inlet tube. The pH is then adjusted to a value of 3 to 4 with 17.1 g of acetic acid, and 0.4 g of 2,2'-azobis-(2-amidinopropane) dihydrochloride is added at an internal temperature of 60° to 70° C., while nitrogen is passed in. Polymerization sets in at 80° C. and is completed by subsequently heating at 80° C. for 2 hours and stirring. After cooling, the pH is adjusted to a value of 3.5 with dilute phosphoric acid.

The yield of a 30% strength solution is 580 g.

EXAMPLE 4

122.5 g of ethanol, 158.3 g of a 60% strength aqueous solution of dimethyldiallylammonium chloride and 5 g of dimethylaminoethyl methacrylate are initially placed in a 700 ml 4-necked flask, equipped with an anchor stirrer, a thermometer, a reflux condenser and a gas inlet tube. The pH of this monomer solution is then adjusted to a value of 4.5 by adding 45 g of acetic acid, and nitrogen is passed in.

After the mixture has been heated to 60° C., 0.2 g of azoisobutyrodinitrile is added, polymerization is carried out at 75° to 80° C. and stirring is continued for a further 2 hours. After cooling, the pH is adjusted to a value of 4.5 with glacial acetic acid.

EXAMPLE 5

122.5 g of ethanol, 158.3 g of a 60% strength aqueous solution of diallyldimethylammonium chloride and 5 g of dimethylamino propyl methacrylamide are initially placed in a 700 ml 4-necked flask, equipped with an anchor stirrer, a thermometer, a reflux condenser and a gas inlet tube, and the mixture is heated to 70° to 75° C. while nitrogen is passed in. 0.2 g of tert.-butyl perbenzoate is added at 60° C., and copolymerization starts at 70° C. and is completed by further stirring at 70° to 75° C. 3 ml of a 1.6% strength ethanolic solution of epichlorohydrin are then added and the mixture is stirred for a further 5 minutes at 70° C. and, after cooling, adjusted to 30% strength with water.

EXAMPLE 6

122.5 g of ethanol, 83.3 g of a 60% strength aqueous solution of dimethyldiallylammonium chloride, 49 g of dimethylaminoethyl methacrylate and 1 g of methyl methacrylate are added in a 700 ml 4-necked flask, equipped with an anchor stirrer, a thermometer, a reflux condenser and a gas inlet tube. The pH is then adjusted to a value of 5.5 to 6 with 55 g of glacial acetic acid, while nitrogen is passed in, and the mixture is heated to 80° C. 0.2 g of 2-phenylazo-2,4-dimethyl-4-methoxyvaleronitrile is added at 70° C., and the copolymerization is initiated. The reaction is complete after 30 minutes; the mixture is stirred for a further 2 hours. It is then adjusted to a concentration of 30% with water.

The yield is 306.5 g. The K-value of a 1% strength aqueous solution is:

| before copolymerization: | 15.4 × 10³ |
| after copolymerization: | 58.1 × 10³. |

EXAMPLE 7

122.5 g of ethanol, 83.3 g of a 60% strength aqueous solution of dimethyldiallylammonium chloride, 1 g of methyl methacrylate and 49 g of trimethyl-(propylmethacrylamide)-ammonium chloride are initially placed in a 700 ml 4-necked flask, equipped with a thermometer, a reflux condenser, an anchor stirrer and a gas inlet tube, the pH is adjusted to a value of 5.9 to 6.0 with 3.8 g of acetic acid, the mixture is heated to 80° C. while nitrogen is passed through, and 0.2 g of dilauroyl peroxide is added at 60° C. Copolymerization sets in at 71° to 74° C. and is completed by heating for a further 2 hours at 70° to 75° C. The mixture is adjusted to a content of 30% with water.

The yield is 307.9 g. The K-values were measured on 1% strength solutions.

| K-value before copolymerization: | 14.5 × 10³, |
| K-value after copolymerization: | 26 × 10³. |

EXAMPLE 8

122.5 g of methylglycol, 83.3 g of a 60% strength aqueous solution of dimethyldiallylammonium chloride and 50 g of dimethylaminoethyl methacrylate are initially placed in a 700 ml 4-necked flask, equipped with an anchor stirrer, a thermometer, a reflux condenser and a gas inlet tube, and the pH of the mixture is adjusted to a value of 8.5 with 3.8 g of glacial acetic acid. Nitrogen is then passed in, the mixture is heated to an internal temperature of 80° C. and 0.2 g of 2,2'-azobis-(2-amidinopropane) dihydrochloride is added at an internal temperature of 60° C. and copolymerization is carried out within the temperature range from 76° to 80° C. Stirring is then continued for a further 2 hours. 22 g of a condensation product formed from 1 mol of adipic acid and 1 mol of diethylenetriamine are then added, followed by 2.052 g of epichlorohydrin in the form of a 10% strength solution in ethanol. Crosslinking of the copolymers is complete after stirring for 10 to 20 minutes at 70° C. The pH of the solution is then adjusted to a value of 7.0 by adding 1.5 g of $H_2SO_4$ (diluted with water in the ratio 1:1).

The yield is 698.7 g of a 15% strength solution.

K-value before copolymerization: $15.7 \times 10^3$,
K-value after copolymerization and crosslinking: $78.8 \times 10^3$.

EXAMPLE 9

122.5 g of isopropanol, 83.3 g of a 60% strength solution of dimethyldiallylammonium chloride and 50 g of dimethylaminopropylmethacrylamide are initially placed in a 700 ml 4-necked flask, equipped with an anchor stirrer, a thermometer, a reflux condenser and a gas inlet tube, the pH of the mixture is adjusted to a value of 8.5 with 12.9 g of glacial acetic acid, and the mixture is heated to an internal temperature of 75° to 80° C. while nitrogen is passed in. 0.2 g of 2,2'-azobis-(2-amidinopropane) dihydrochloride is added at 50°. The copolymerization begins between 72° and 74° C. and is completed by subsequently stirring at 80° C.

22 g of the condensation product formed from 1 mol of adipic acid and 1 mol of diethylenetriamine are then added in the form of an aqueous solution. 0.821 g of epichlorohydrin is then added and crosslinking is carried out for 10 minutes at 50° C.

The pH is then adjusted to a value of 7 by adding 9.8 g of $H_2SO_4$ (diluted with water in the ratio of 1:1).

The yield is 315 g, in the form of a 30% strength solution.

| | |
|---|---|
| K-value of the solution before copolymerization: | $17.3 \times 10^3$, |
| K-value of the solution after copolymerization: | $30.6 \times 10^3$, |
| K-value of the solution after crosslinking: | $42 \times 10^3$. |

EXAMPLE 10

122.5 g of ethylene glycol, 150 g of a 60% strength aqueous solution of dimethyldiallylammonium chloride and 10 g of dimethylaminopropylmethacrylamide are initially placed in a 700 ml 4-necked flask, equipped with an anchor stirrer, a thermometer, a reflux condenser and a gas inlet tube, the pH of the mixture is adjusted to a value of 8.5 with 3.5 g of glacial acetic acid, and the mixture is heated to 75° to 80° C. while nitrogen is passed in. 0.1 g of 2,2'-azobis-(2-amidinopropane) dihydrochloride is added at 55° C. The copolymerization begins within the temperature tange from 70° to 74° C. and is completed by subsequently heating for 2 hours at 80° C. 22.2 g of polyethyleneimine (50% aqueous soution) and 30 ml of water as well as 0.536 g of epichlorohydrin in alcoholic solution are then added. Crosslinking is carried out at 70° C. for 20 minutes, and the reaction is then discontinued by adding $H_2SO_4$ (diluted with water in the ratio of 1:1) and by adjusting the pH of the mixture to a value of 7.0.

The yield is 344 g of a 30% strength copolymer solution. The reaction is followed by measurement of the K-value:

The following values were found on a 1% strength solution:

| | |
|---|---|
| K value before copolymerization: | $16.3 \times 10^3$, |
| K value after copolymerization: | $24.8 \times 10^3$, |
| K value after crosslinking: | $34.4 \times 10^3$. |

EXAMPLE 11

245 g of ethanol, 316.5 g of a 60% strength aqueous solution of dimethyldiallylammonium chloride and 10 g of acrylamide are initially placed in a 1 l 4-necked flask, equipped with an anchor stirrer, a thermometer, a reflux condenser and a gas inlet tube. The pH of the mixture is then adjusted to a value of 3.5 with acetic acid, while nitrogen is passed in, 400 mg of 2,2'-azobis-(2-amidinopropane) dihydrochloride are added and the mixture is heated to 70° to 80° C. The polymerization begins at an internal temperature of 75° C. and is completed by stirring for a further 2 hours at 75° to 80° C.

| | |
|---|---|
| K-value before the copolymerization in aqueous solution: | $13 \times 10^3$, |
| K-value after copolymerization: | $34.7 \times 10^3$ |
| K-value after crosslinking: | $37.7 \times 10^3$. |

USE EXAMPLE 1

A boiled-off cotton knitted material is dyed in a liquor containing 3% of C.I. Reactive Blue 89, 3% of C.I. Reactive Black 5, 1 g/l of a commercial water softening agent based on polyphosphate, 50 g/l of sodium sulphate decahydrate and 20 g/l of calcined sodium carbonate. The material is dyed for 1 hour at a dyeing temperature of 60° C. and the sample is then neutralized under cold conditions with acetic acid and rinsed for 10 minutes with hot water.

After being soaped at the boil, the material is treated for 20 minutes at room temperature in a solution containing 5%, calculated on the dry weight of the goods, of a product, according to the invention, for Example 1 or 10. Only one cold rinse is then carried out. The fastness values indicated in column 3 of the table below are obtained for the staining of undyed adjacent cotton fabric. For comparison, the values of fastness properties obtained only by soaping at the boil without subsequent treatment with a textile auxiliary are shown in column 2. The values of fastness properties obtained using 5% of a commercial textile auxiliary based on a peralkylated polyamine are shown for comparison in column 4.

| Fastness property | Soaped dyeing | 5% of product from Example 1 or 10 | 5% of commercial textile auxiliary |
|---|---|---|---|
| Water, under severe conditions (DIN 54,006) | 4 | 5 | 5 |
| Alkaline perspiration (DIN 54,020) | 4 | 5 | 4 |
| Acid perspiration (DIN 54,020) | 4 | 5 | 4 |
| Washing at 60° C. (DIN 54,010) | 3 | 4 to 5 | 3 to 4 |
| Peroxide washing at 60° C. (DIN 54,015) | 2 to 3 | 4 | 3 |
| Washing at 95° C. (DIN 54,012) | 2 | 3 to 4 | 2 to 3 |
| Fastness to rubbing (DIN 54,021) | | | |
| under dry conditions | 3 | 4 | 4 |
| under wet conditions | 3 | 3 | 2 to 3 |

USE EXAMPLE 2

500 m of a viscous lining material are first washed on a jigger for 30 minutes at 60° C. with 2 g/l of washing agent based on a reaction product formed from 1 mol of 4-nonylphenol and 10 mol of ethylene oxide, and are rinsed and then dyed for 60 minutes at 60° to 90° C. with 4% of C.I. Direct Red 23, with the addition of 10% of sodium sulphate. After being rinsed with cold water and dried, the fabric is padded as follows on a padder:

65 g/l of ®Arkofix NG, concentrated
(commercial permanent finishing agent made by Hoechst AG, Frankfurt/Main 80 and based on dimethyloldihydroxyethyleneurea. Arkofix is a registered trade mark of Hoechst AG).
10 g/l of polyethylene dispersion
60 g/l of zirconium oxychloride/paraffin emulsion
1 ml/l of 60% strength acetic acid
20 g/l of $MgCl_2.6H_2O$ and
40 g/l of the product according to Example 10.

The fabric was dried at 110° C. and then subjected to condensation for 4 minutes at 150° C. The goods thus treated and finished have the fastness rating 5 when fastness to washing is determined for mechanical washing at 60° C. as specified in DIN 54,010. For comparison, the fastness ratings obtained without the textile auxiliary and with equal amounts of commercial textile auxiliary are also shown in the table below:

| Textile auxiliary | Washing at 60° C. (DIN 54,010) |
| --- | --- |
| None | 3 |
| According to Example 10 | 5 |
| According to Example 1 | 5 |
| Commercial preparation 1 | 3 to 4 |
| Commercial preparation 2 | 3 to 4 |
| Commercial preparation 1, based on peralkylated polyamine | |
| Commercial preparation 2, based on an amine hydrochloride/dicyanodiamide/formaldehyde condensation product. | |

USE EXAMPLE 3

A 5% strength dyeing is produced on cotton knitted fabric with C.I. Reactive Blue 89 and is finished by rinsing, soaping at the boil and drying. The dry dyeing is padded with the following finishing liquor, which contains:

65 g/l of ®Arkofix NDS, concentrated
(commercial permanent finishing agent made by Hoechst AG, Frankfurt/Main 80 and based on modified N-methyloldihydroxyethyleneurea)
20 g/l of $MgCl_2.6H_2O$
30 g/l of product according to the invention, from Example 10, and
20 g/l of softener Hoe-T-3492-1
(commercial softener made by Hoechst AG, Frankfurt/Main 80, and based on a fatty acid condensation product).

The goods are then dried at 110° C. and subjected to condensation for 4 minutes at 150° C. As a result of adding the copolymer according to the invention from Example 10 the fastness to water (under severe conditions) as specified in DIN No. 54,006 and the fastness properties to acid and alkaline perspiration as specified in DIN No. 54,020, compared with goods without aftertreatment, are raised by 1 rating, as is evident from the table below.

| Fastness | Without auxiliary | With the product according to Example 1 |
| --- | --- | --- |
| Fastness to water under severe conditions (DIN 54,006) | 3 to 4 | 5 |
| Fastness to acid perspiration (DIN 54,020) | 4 | 5 |
| Fastness to alkaline perspiration (DIN 54,020) | 4 | 5 |

It should also be noted that the fastness properties to light under wet conditions are not diminished compared with the use of commercial dicyanodiamide/formaldehyde condensation products or peralkylated polyamines.

USE EXAMPLE 4

A 4% strength dyeing of C.I. Reactive Orange 82 on a cotton material is finished by rinsing, soaping at the boil and drying, and is padded in the dry state with a finishing liquor containing:

65 g/l of ®Arkofix NG, concentrated
(commercial catalyst made by Hoechst AG, Frankfurt/Main 80, and based on metal salts)
15 g/l of $MgCl_2.6H_2O$
20 g/l of ®Leomin NI
(commercial softener made by Hoechst AG, Frankfurt/Main 80, and based on a fatty acid condensation product. Leomin is a registered trade mark of Hoechst AG.) and
30 g/l of the product according to Example 8.

The goods are then dried at 110° C. and subjected to condensation for 4 minutes at 150° C. As a result of the use of the copolymer according to the invention the fastness properties to water and perspiration are markedly improved, without the fastness properties to light under wet conditions being impaired.

USE EXAMPLE 5

A 4% strength dyeing of C.I. Reactive Orange 82 on a cotton material is finished by rinsing and soaping at the boil and dyring, and is padded in the dry state with a finishing liquor containing:

65 g/l of ®Arkofix NDS, concentrated
(commercial permanent finishing agent made by Hoechst AG, Frankfurt/Main 80, and based on modified N-methyloldihydroxyethyleneurea)
20 g/l of catalyst 3282
(commercial catalyst made by Hoechst AG, Frankfurt/Main 80, and based on metal salts) and
20 g/l of softener Hoe-T-3492-1
(commercial softener made by Hoechst AG, Frankfurt/Main 80, and based on a fatty acid condensation product).

The goods are then dried at 110° C. and subjected to condensation for 4 minutes at 150° C. For comparison goods containing additionally 30 g/l of the copolymer solution according to the invention from Example 10 are prepared.

Compared with the goods without the copolymer according to the invention from Example 10, the fastness properties to water under severe conditions and the fastness properties to acid and alkaline perspiration are improved by one rating, without the fastness properties to light under wet conditions being impaired.

USE EXAMPLE 6

A 4% strength dyeing of C.I. Reactive Blue 89 on a cotton fabric is finished by rinsing, soaping at the boil and drying, and is padded in the dry state with a finishing liquor containing:
65 g/l of ®Arkofix NG, concentrated
  (commercial permanent finishing agent made by Hoechst AG, Frankfurt/Main 80, and based on dimethyloldihydroxyethyleneurea)
15 g/l of MgCl$_2$.6H$_2$O and
20 g/l of ®Leomin NI
  (commercial softener made by Hoechst AG, Frankfurt/Main 80, and based on a fatty acid condensation product).

The goods are then dried at 110° C. and subjected to condensation for 4 minutes at 150° C. Goods containing in addition 30 g/l of the copolymer according to the invention from Example 9 are also prepared for comparison.

As a result of the use of the copolymer solution according to the invention from Example 9, the fastness to water under severe conditions and the fastness properties to perspiration are raised by one rating, without the fastness properties to light under wet conditions being impaired.

USE EXAMPLE 7

Boiled-off and bleached cotton yarn is dyed in a liquor containing:
2% of C.I. Reactive Red 123
2% of C.I. Reactive Red 124
1 g/l of a commercial water softening agent based on polyphosphate and
25 g/l of sodium sulphate decahydrate.

Dyeing is carried out for 10 minutes at 40° C., a further 25 g/l of sodium sulphate decahydrate are added and, after a further 30 minutes, 20 g/l of sodium carbonate are added. Dyeing is complete after a further hour.

After dyeing, the goods are neutralized in a customary manner with acetic acid under cold conditions and are rinsed and treated for 20 minutes at pH 6 with 5% (relative to the dry weight) of the product from Example 8.

A dyeing having markedly improved fastness properties, which are determined via the staining of an undyed adjacent cotton fabric, is obtained:

| Fastness | Unsoaped dyeing | 5% of product from Example 8 | Commercial auxiliary* |
|---|---|---|---|
| Water under severe conditions (DIN 54,006) | 2 to 3 | 3 to 4 | 2 to 3 |
| Alkaline perspiration (DIN 54,020) | 2 | 4 | 2 |
| Acid perspiration (DIN 54,020) | 2 | 4 | 2 |
| Washing at 60° C. (DIN 54,010) | 3 | 4 | 3 |
| Washing at 95° C. (DIN 54,012) | 2 to 3 | 4 | 3 |

*The commercial auxiliary used was an auxiliary based on peralkylated polyamine.

Improvements are obtained in the same manner if the dyeings are produced by the pad-steam, pad-jig or cold pad-batch process.

What is claimed is:

1. A copolymer containing the copolymerized monomers:

(A) a dialkylammonium component of the formula:

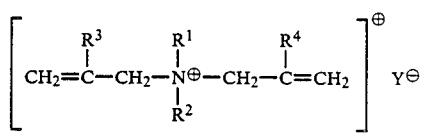

(B) an amide component of the formula:

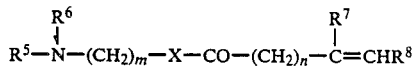

(C) a (meth)acrylic ester component of the formula:

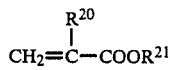

in a molar ratio A:B:C of 1:(0.002 to 4.5):(0 to 5), and the copolymer is cross-linked with
(D) a polyfunctional alkylation component and
(E) a polyamine component comprising at least one polyamine of the formula

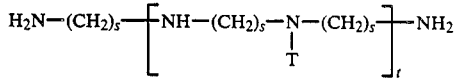

or of the formula

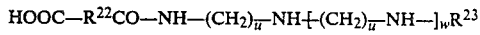

in a molar ratio B:D:E of 1:(0.002 to 2):(0 to 5); wherein
R$^1$, R$^2$, R$^5$, R$^6$ and R$^{21}$ are, independent of each other, alkyl having 1 to 10 carbon atoms;
R$^3$, R$^4$, R$^7$, R$^8$ and R$^{20}$ are, independent of each other, hydrogen or methyl;
R$^{22}$ is an alkylene having 1 to 8 carbon atoms or phenylene;
R$^{23}$ is hydrogen or —CO—R$^{22}$—COOH;
T is

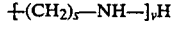

X is —NH— or —O—; and
Y$^\ominus$ is one equivalent of an anion;
m is an integer from 2 to 10;
n is zero or an integer from 1 to 3;
w is zero or an integer from 1 to 3;
s and u are, independent of each other, an integer from 2 to 5;
v is zero or an integer and t is an integer, with the magnitude of v and t being of sufficient magnitude that the polyamine defined thereby has a molecular weight of 1,000 to 30,000.

2. A copolymer according to claim 1 wherein the molar ratio of A:B:C is 1:(0.02 to 2.5):0.

3. A copolymer according to claim 1 wherein the molar ratio of B:D:E is 1:(0.002 to 1):(0.05 to 5).

4. A copolymer according to claim 1 wherein the molar ratio of B:D:E is 1:(0.01 to 1):(0.1 to 4.5).

5. A process for preparation of the copolymer according to claim 1 wherein monomers (A), (B) and (C)

are copolymerized in water or a water-miscible solvent at a temperature from 40° to 100° C. in a molar ratio of A:B:C of 1:(0.002 to 4.5):(0 to 0.5), and the copolymerized product is subsequently reacted with (D) and (E) at a temperature from 30° to 80° C. in a molar ratio of B:D:E of 1:(0.002 to 2):(0 to 5).

6. A process according to claim 5 wherein the molar ratio of A:B:C is 1:(0.02 to 2.5):0.

7. A process according to claim 5 wherein the molar ratio of B:D:E is 1:(0.002 to 1):0.05 to 5).

8. A process according to claim 5 wherein the molar ratio of B:D:E is 1:(0.01 to 1):(0.1 to 4.5).

9. A process according to claim 5 wherein the molar ratio of A:B:C is 1:(0.02 to 2.5):0 and the molar ratio of B:D:E is 1:(0.002 to 1):(0.05 to 5).

10. In the method improving the fastness of prints or dyeings from a textile printing or dyeing process by a fastness-improving auxiliary in the process, the improvement comprises said auxiliary being a copolymer according to claim 1.

11. The method according to claim 10 wherein the prints and dyeings are produced by reactive dyestuffs, substantive dyestuffs or vat dyestuffs.

12. The method according to claim 10 wherein the dyeing is the quasione-both sizing and dyeing of cellulose materials with vat dyestuffs.

* * * * *